(12) United States Patent
Quest (10) Patent No.: US 10,173,492 B2
(45) Date of Patent: Jan. 8, 2019

(54) DISPENSING CANISTER APPARATUS WITH THERMOCHROMIC CLIP

(71) Applicant: Michael E. Quest, Arden, NC (US)

(72) Inventor: Michael E. Quest, Arden, NC (US)

(73) Assignee: TSI Products, Inc., Arlington, TX (US)

(*) Notice: Subject to any disclaimer, the term of this patent is extended or adjusted under 35 U.S.C. 154(b) by 0 days.

(21) Appl. No.: 15/360,416

(22) Filed: Nov. 23, 2016

(65) Prior Publication Data

US 2017/0072769 A1 Mar. 16, 2017

Related U.S. Application Data

(63) Continuation-in-part of application No. 14/793,769, filed on Jul. 8, 2015.

(Continued)

(51) Int. Cl.
| | |
|---|---|
| *B60H 1/00* | (2006.01) |
| *G01F 23/22* | (2006.01) |
| *G01K 11/12* | (2006.01) |
| *B65D 83/20* | (2006.01) |
| *B65D 83/30* | (2006.01) |
| *B65D 83/38* | (2006.01) |

(Continued)

(52) U.S. Cl.
CPC ..... *B60H 1/00585* (2013.01); *B60H 1/00807* (2013.01); *B60H 1/00985* (2013.01); *B65D 83/201* (2013.01); *B65D 83/303* (2013.01); *B65D 83/38* (2013.01); *B65D 83/752* (2013.01); *B65D 83/756* (2013.01); *G01F 23/22* (2013.01); *G01K 1/14* (2013.01); *G01K 11/12* (2013.01); *G01K 11/16* (2013.01); *G01K 13/02* (2013.01); *G01K 2013/024* (2013.01); *G01K 2201/02* (2013.01)

(58) Field of Classification Search
None
See application file for complete search history.

(56) References Cited

U.S. PATENT DOCUMENTS

| | | |
|---|---|---|
| 5,996,357 A | 12/1999 | Park |
| 6,085,530 A | 7/2000 | Barito |

(Continued)

OTHER PUBLICATIONS

International Searching Authority, Korean Intellectual Property Office; Written Opinion of the International Search Authority; dated Oct. 23, 2015; Application PCT/US2015-039637.

*Primary Examiner* — Lisa Caputo
*Assistant Examiner* — Nasir U Ahmed
(74) *Attorney, Agent, or Firm* — The Van Winkle Law Firm; William G. Heedy (57) ABSTRACT

A dispensing canister apparatus for controlled release of a stored fluid includes first and second thermochromic clips for providing a visual indication of the ambient air temperature; a hose member surrounding a channel and having first and second open ends, and the first open end being connected to the canister such that the channel is in fluid flow communication with the inner cavity; a control on the canister for selectively actuating the flow of the stored fluid from the inner cavity into the channel and through a coupler member at the second open end of the hose member; and wherein storage of the first thermochromic clip in the first receptacle positions the fastening member such that it obstructs movement of the control for actuating the flow of the stored fluid.

7 Claims, 8 Drawing Sheets

Related U.S. Application Data

(60) Provisional application No. 62/259,698, filed on Nov. 25, 2015, provisional application No. 62/022,821, filed on Jul. 10, 2014.

(51) Int. Cl.
*B65D 83/14* (2006.01)
*G01K 1/14* (2006.01)
*G01K 11/16* (2006.01)
*G01K 13/02* (2006.01)

(56) References Cited

U.S. PATENT DOCUMENTS

| | | | |
|---|---|---|---|
| 6,185,945 B1* | 2/2001 | Pfefferle | B60H 1/00585 |
| | | | 62/149 |
| 7,344,277 B2 | 3/2008 | Anderson et al. | |
| 7,552,596 B2 | 6/2009 | Galante et al. | |
| 7,845,305 B2 | 12/2010 | Linke et al. | |
| 8,115,182 B1* | 2/2012 | Patel | G01T 1/04 |
| | | | 250/482.1 |
| 2006/0130733 A1* | 6/2006 | Linke | G01K 11/12 |
| | | | 116/216 |
| 2006/0137367 A1* | 6/2006 | Galante | F25B 45/00 |
| | | | 62/149 |
| 2007/0119963 A1* | 5/2007 | DiBello | A61L 9/127 |
| | | | 239/34 |

* cited by examiner

DISPENSING CANISTER APPARATUS WITH THERMOCHROMIC CLIP

RELATED APPLICATION

This application is a Continuation-in-part Patent Application of U.S. Nonprovisional patent application Ser. No. 14/793,769 filed Jul. 8, 2015, which claims the benefit of U.S. Provisional Patent Application Ser. No. 62/022,821 filed on Jul. 10, 2014, and further relates to and claims the benefit of U.S. Provisional Patent Application Ser. No. 62/259,698 filed on Nov. 25, 2015.

FIELD OF THE INVENTION

This invention relates to a device for visually indicating the output temperature of an air conditioning unit and, more particularly, to a thermochromic clip securable to a vent for visually indicating one or more temperature output ranges.

BACKGROUND OF THE INVENTION

Automobile air conditioners traditionally include an orifice tube or expansion valve. Because an expansion valve is essentially a fixed valve with free flow of the refrigerant, the pressure as measured on both the high and low side is a function of both the amount of refrigerant therein, as well as the ambient temperature. A suitable pressure range for the correct refrigerant fill was established many years ago, which is based on increasing the pressure as the ambient temperature rises. More recently, automobile manufacturers have started using thermostatic expansion valves with sensing bulbs that are designed to meter, or restrict, the flow of refrigerant into the evaporator, thereby providing more efficient cooling by controlling the super heating at the evaporator outlet. The control of the metering is located at the outlet of the evaporator. These automobile manufacturers use the evaporator outlet temperature, independent of the ambient temperature, to regulate the thermostatic expansion valves, which meters the refrigerant flow and sets a maximum predetermined pressure at the evaporator outlet.

For systems having a thermostatic expansion valve and sensing bulbs, as refrigerant is added during servicing, the pressure on the low side rises until it reaches this predetermined maximum level. If this pressure level is below the gauge's established correct fill range, even if the system is fully charged, adding additional refrigerant will not bring the pressure reading up to gauge's established fully charge pressure reading. As additional refrigerant is added, the excessive pressure builds up on the high side and can only be measured using a high side gauge. Because the fully charged pressure on systems using a thermostatic expansion valve and sensing bulb remains constant and the gauge's fully charged requirement rises as the ambient temperature goes up, the higher the ambient temperature the larger the gap between the system being fully charged and it showing fully charged on the low side gauge. In these cases, using only a low side gauge can potentially cause too much refrigerant to be added and result in damage to the compressor or other problems associated with overcharging.

In light of the problems advanced above, there exists a need for a device for visually indicating when the correct amount of refrigerant has been introduced to an air conditioning system and preventing the problems associated with overfilling an air conditioner with refrigerant.

SUMMARY OF THE INVENTION

In accordance with one form of the present invention, there is provided a dispensing canister apparatus for controlled release of a stored fluid, the dispensing canister apparatus including first and second thermochromic clips for providing a visual indication of the ambient air temperature, and each of the first and second thermochromic clips including an elongate body having an outer facing surface; a fastening member on the elongate body, and the fastening member being sized and configured for selective attachment to an object; and at least the outer facing surface of the elongate body being coated with a thermochromic material, and the thermochromic material of the outer facing surface being structured and disposed for changing from a first color state to a second color state in response to a change in temperature that places the thermochromic material at a temperature equal to or below a predetermined temperature value; a canister having an outer wall defining an inner cavity and including first and second receptacles each being sized for storage of a corresponding one of the first and second thermochromic clips; a hose member surrounding a channel and having first and second open ends, and the first open end being connected to the canister such that the channel is in fluid flow communication with the inner cavity; a control on the canister for selectively actuating the flow of the stored fluid from the inner cavity into the channel and through a coupler member at the second open end of the hose member; and wherein storage of the first thermochromic clip in the first receptacle positions the fastening member such that it obstructs movement of the control for actuating the flow of the stored fluid.

In accordance with another form of the present invention, there is provided a dispensing canister apparatus for controlled release of a stored fluid, the dispensing canister apparatus including at least one thermochromic clip for providing a visual indication of the ambient air temperature, and the at least one thermochromic clip including an elongate body having an outer facing surface; a fastening member on the elongate body, and the fastening member being sized and configured for selective attachment to an object; and at least the outer facing surface of the elongate body being coated with a thermochromic material, and the thermochromic material of the outer facing surface being structured and disposed for changing from a first color state to a second color state in response to a change in temperature that places the thermochromic material at a temperature equal to or below a predetermined temperature value; a canister having an outer wall defining an inner cavity and including at least one receptacle for storage of a corresponding one of the at least one thermochromic clips; a hose member surrounding a channel and having first and second open ends, and the first open end being connected to the canister such that the channel is in fluid flow communication with the inner cavity; a trigger on the canister for selectively actuating the flow of the stored fluid from the inner cavity into the channel and through a coupler member at the second open end of the hose member; and wherein storage of the at least one thermochromic clip in the at least one receptacle positions the fastening member such that it obstructs movement of the control for actuating the flow of the stored fluid.

In accordance with yet another form of the present invention, there is provided a dispensing canister apparatus for controlled release of a stored fluid, the dispensing canister apparatus including at least one thermochromic clip for providing a visual indication of the ambient air temperature, and the at least one thermochromic clip including an elongate body having an outer facing surface; a fastening member on the elongate body, and the fastening member being sized and configured for selective attachment to an object; and at least the outer facing surface of the elongate body being coated with a thermochromic material, and the thermochromic material of the outer facing surface being structured and disposed for changing from a first color state to a second color state in response to a change in temperature that places the thermochromic material at a temperature equal to or below a predetermined temperature value; an interchangeable canister having an outer wall extending between top and bottom ends and defining an inner cavity for containing the stored fluid, and the interchangeable canister including a valve nozzle; a trigger cap being selectively attachable to the top end of the interchangeable canister, wherein a nozzle channel is positioned for fluid flow communication with the valve nozzle on the interchangeable canister, and the trigger cap including a trigger for selectively actuating the flow of the stored fluid from the inner cavity into the channel and through a coupler member at the second open end of the hose member; a hose member surrounding a channel and having first and second open ends, and the first open end having a coupling member for connecting to the nozzle channel on the trigger cap such that the channel is in fluid flow communication with the inner cavity; and a bottom cap partially surrounding an interior cavity sized for receipt of the hose member and the at least one thermochromic clip, and the bottom cap being selectively attachable to the bottom end of the interchangeable canister.

BRIEF DESCRIPTION OF THE DRAWINGS

For a fuller understanding of the nature of the present invention, reference should be made to the following detailed description, taken in conjunction with the accompanying drawings in which.

Like reference numerals refer to like parts throughout the several views of the drawings.

DETAILED DESCRIPTION OF THE PREFERRED EMBODIMENTS

Referring to the several views of the drawings, in one embodiment of the present invention, one or more thermochromic clips 10 are used in conjunction with a dispensing canister apparatus 18 as part of a kit for providing a visual indication of the temperature of the air flowing through an air vent 100 as refrigerant is introduced into an air conditioning system, such as an automobile air conditioning system. As used herein, the term "automobile" includes any motorized vehicle.

Figure 1A:
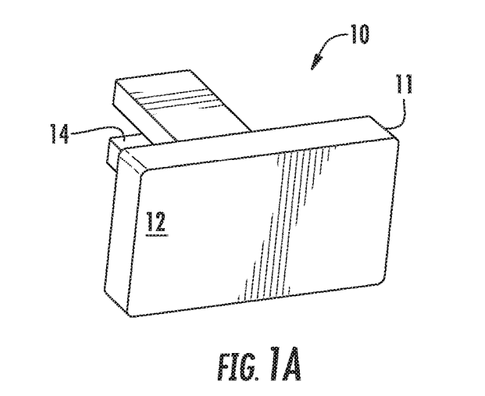
FIG. 1A is perspective view of a thermochromic clip of the present invention in accordance with one embodiment.
Figure 1B:
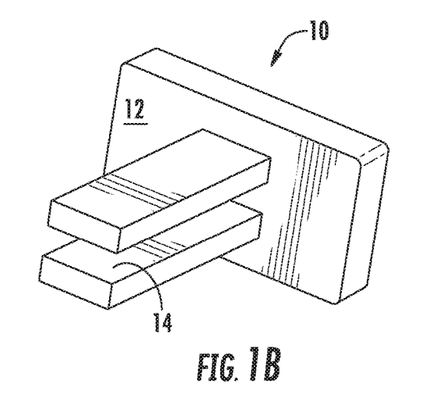
FIG. 1B is perspective view of a thermochromic clip of the present invention in accordance with one embodiment.

Referring to FIGS. 1A and 1B, a thermochromic clip 10 includes an elongate member 11 having an outer surface coating 12 made from a thermochromic material, such as thermochromic ink or paint. Alternatively, the thermochromic material may be injected into the elongate member 11 that is at least partially transparent. A fastener 14, such as a two-pronged clasp, is included on the elongate member 11. In one embodiment, the fastener 14 includes outer surface coating 12 made from a thermochromic material.

Figure 2:
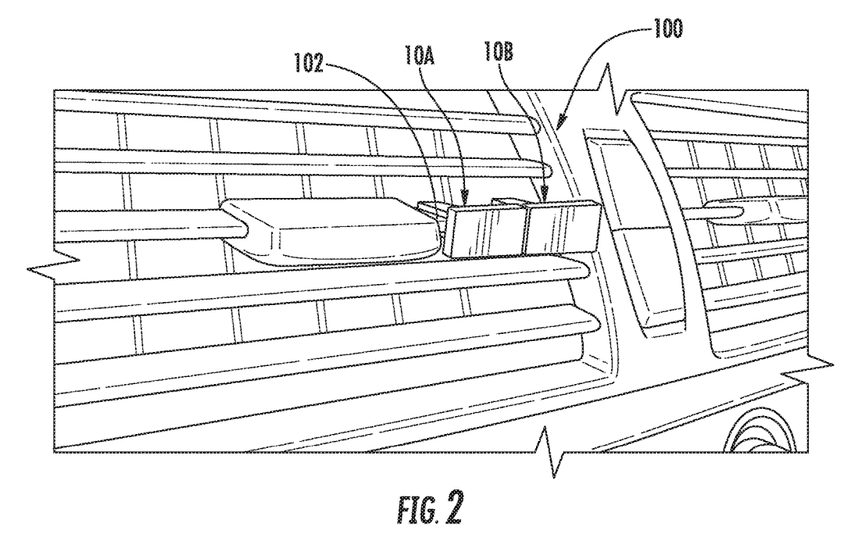
FIG. 2 is a perspective view of air conditioning vent having first and second thermochromic clips secured thereto.

Referring to FIG. 2, first and second thermochromic clips 10A and 10B are shown secured to air vent 100, such as an automobile air conditioning vent, wherein the fastener 14 is secured to an air vent vane 102 on air vent 100. In one embodiment, as shown in the drawings, the fastener 14 is a two-pronged clasp sized for grasping around and holding onto an air vent vane 102.

The outer surface coating 12 on each of the first and second thermochromic clips 10A and 10B is at least partially made from a thermochromic material that is designed to change from a first color state, or pigment, to a second color state, or pigment, in response to a change in temperature and, more particularly, in response to a change in temperature placing the thermochromic material at a predetermined temperature value. In a preferred embodiment, the thermochromic clip 10 is made from a plastic substrate; however, any other suitable material may be used as well.

In one embodiment, the respective outer surface coatings 12 for each of the first and second thermochromic clips 10A and 10B are structured and disposed to change from a first color state to a second color state at different, predetermined temperatures, wherein clip 10A changes color state at a higher temperature than clip 10B as each of the clips 10A and 10B become colder. In a preferred embodiment, clip 10A changes from a first color state to a second color state when the temperature cools to a predetermined temperature value selected for indicating that refrigerant is actively being introduced to the air conditioning system. Similarly, in a preferred embodiment, clip 10B changes from a first color state to a second color state when the temperature cools to a predetermined temperature value selected for indicating that the refrigerant has reached its fully charged, optimum fill level within the air conditioning system. By way of a non-limiting example, the outer surface coating 12 of thermochromic clip 10A may be structured and disposed to change from a first color state to a second color state at a temperature of 60° F. or lower and the outer surface coating 12 of thermochromic clip 10B may be structured and disposed to change from a first color state to a second color state at a temperature of 50° F. or lower. Accordingly, in the example above, thermochromic clip 10A is in a first color state at temperatures above 60° F. and a second color state at temperatures 60° F. and below, while thermochromic clip 10A is in a first color state at temperatures above 50° F. and a second color state at temperatures 50° F. and below.

Figure 3A:
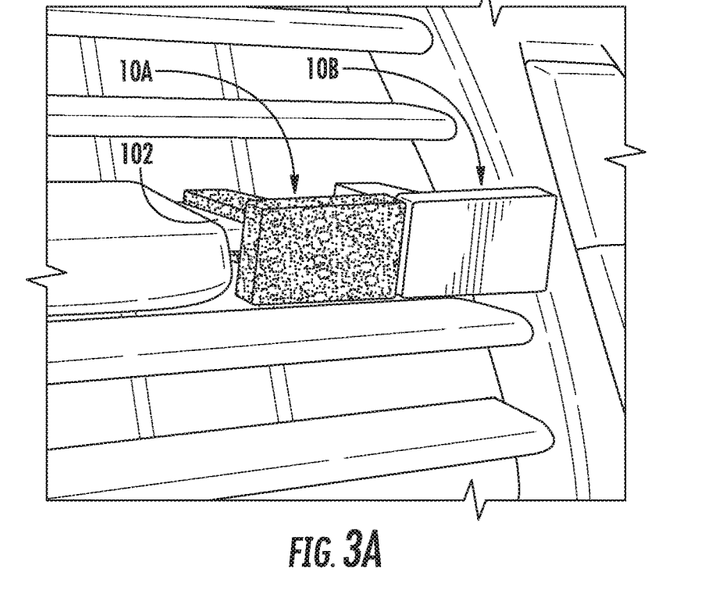
FIG. 3A is a perspective view of air conditioning vent having first and second thermochromic clips secured thereto, wherein the first thermochromic clip has changed color.
Figure 3B:
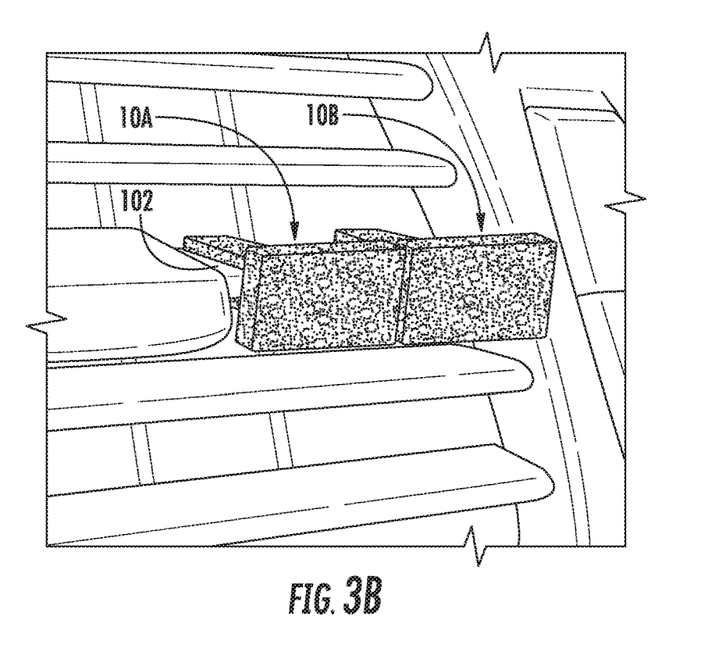
FIG. 3B is a perspective view of air conditioning vent having first and second thermochromic clips secured thereto, wherein each of the first and second thermochromic clips have changed color.

In operation, as refrigerant is introduced to the air conditioning system, cold air flows through the air vents 100 at a rate as selectively determined by a user. It is preferable for the air vent 100 to be set to permit cold airflow through the air vent 100 at its highest setting in order to most effectually determine when the refrigerant has reached the optimum fill level. As shown in FIG. 3A, the outer surface coating 12 of thermochromic clip 10A changes from a first color state to a second color state while the outer surface coating 12 of thermochromic clip 10B remains in the first color state. As the refrigerant approaches optimum fill level, the air flowing through the air vent will become colder and the outer surface coating 12 of thermochromic clip 10B changes from a first color state to a second color state, as shown in FIG. 3B.

Figure 4:
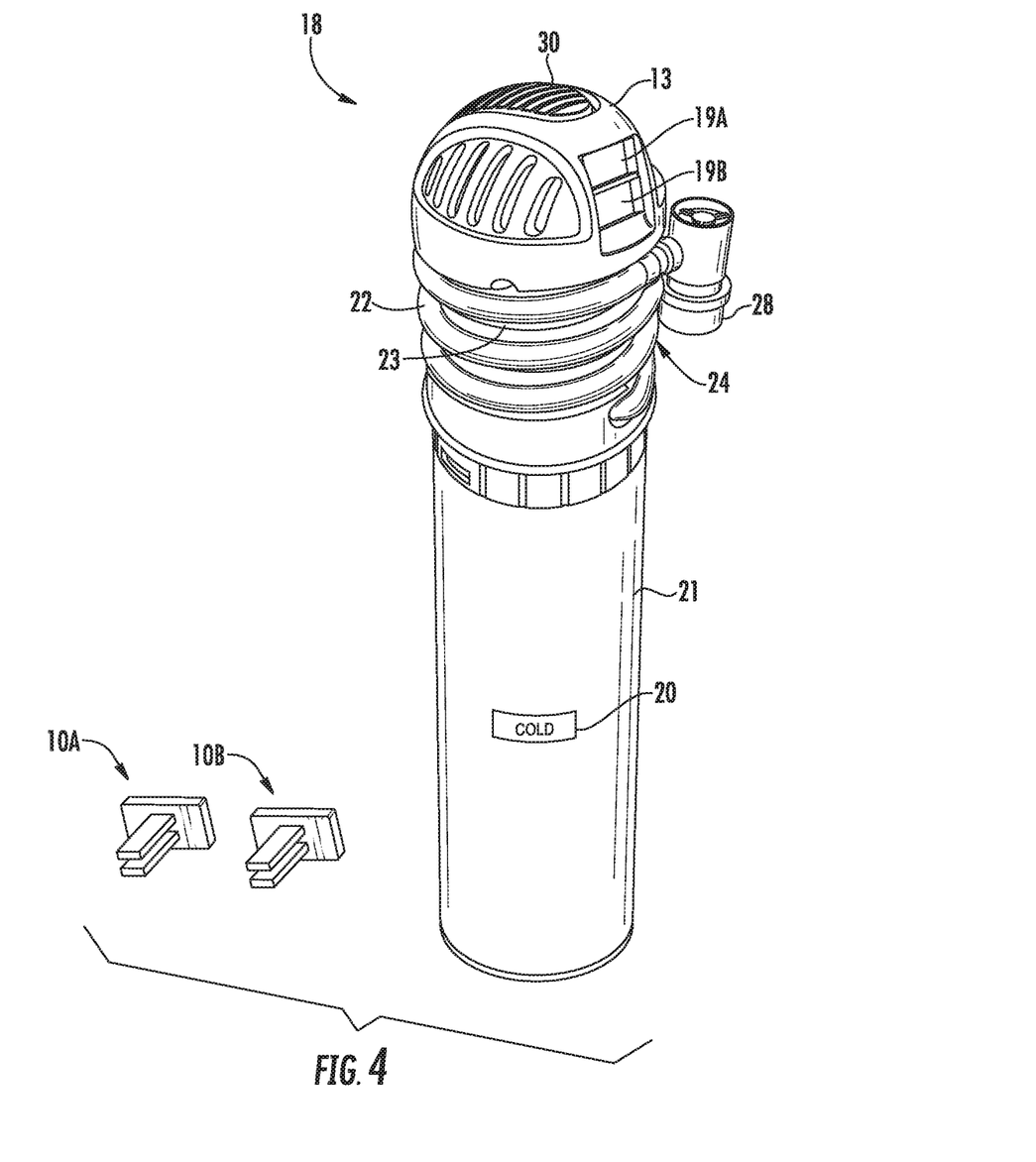
FIG. 4 is a perspective view of the dispensing canister apparatus with thermochromic clips removed.
Figure 5:
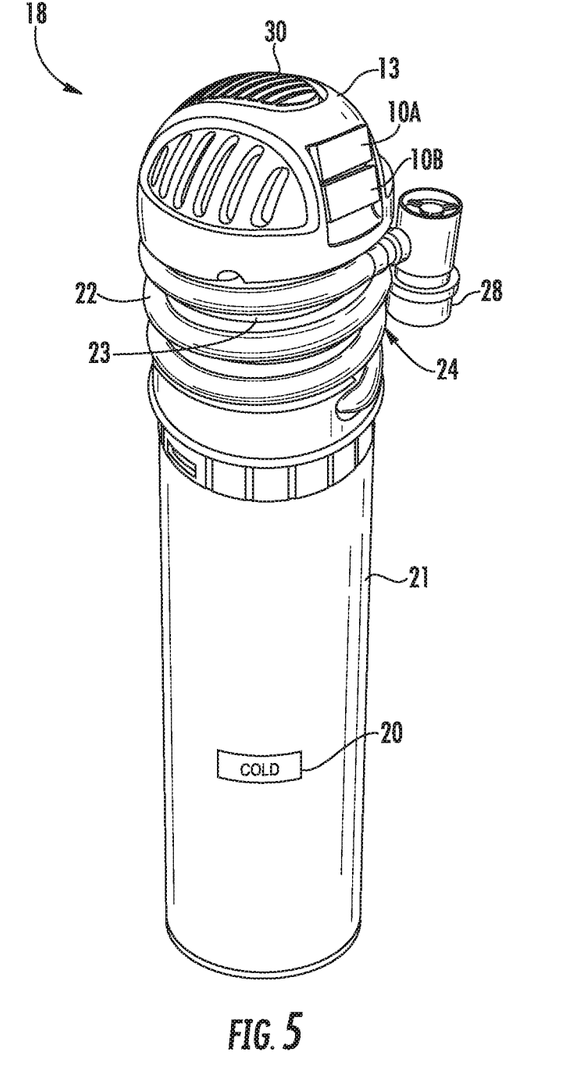
FIG. 5 is a perspective view of the dispensing canister apparatus shown in FIG. 4 with thermochromic clips secured thereto.

FIGS. 4 and 5 illustrate a first embodiment of a dispensing canister apparatus 18 for use in conjunction with first and second thermochromic clips 10A and 10B, as described above. The canister 18 includes an outer wall 21 surrounding an inner cavity filled with a charge of refrigerant. First and second receptacles 19A and 19B on the dispensing canister apparatus 18 are each sized and configured for selective receipt of a respective one of the first and second thermochromic clips 10A and 10B. A hose member 22 is formed by a flexible tubular member 24 surrounding a channel between first and second open ends. A groove 23 formed on the outer wall 21 of the dispensing canister apparatus 18 is sized for partial engaged receipt of the hose member 22 when the dispensing canister apparatus 18 is not in use. The first open end of flexible tubular member 24 is connected to the dispensing canister apparatus 18 such that the channel is in fluid flow communication with the inner cavity of the dispensing canister apparatus 18. A coupler member 28 at the second end of the flexible tubular member 24 is provided for connecting with the air conditioning system and, more particularly, with the low-side service port of an automobile air conditioning system. Flow of refrigerant from the inner cavity into the channel and through the second open end of the hose member 22 at coupler member 28 is selectively operable using a control 30, such as a push button or twistable knob in communication with a valve on the canister 18.

Referring still to FIGS. 4 and 5, the outer wall 21, or at least a portion thereof, of the dispensing canister apparatus 18 may include a surface coating 20 including thermochromic material that is structured and disposed for changing from a first color state to a second color state in response to a change in temperature that places the thermochromic material at a temperature equal to or below a predetermined temperature value in order to indicate cooling of the canister 18 as refrigerant exits the inner cavity of dispensing canister apparatus 18 when being introduced to the air conditioning system.

In one embodiment, the thermochromic material on the respective outer surface coatings 12 on each of the first and second thermochromic clips 10A and 10B is unique, such that clip 10A changes to a first color upon reaching the first predetermined temperature value while clip 10B changes to a second color state upon cooling to the second predetermined temperature value.

Figure 6:
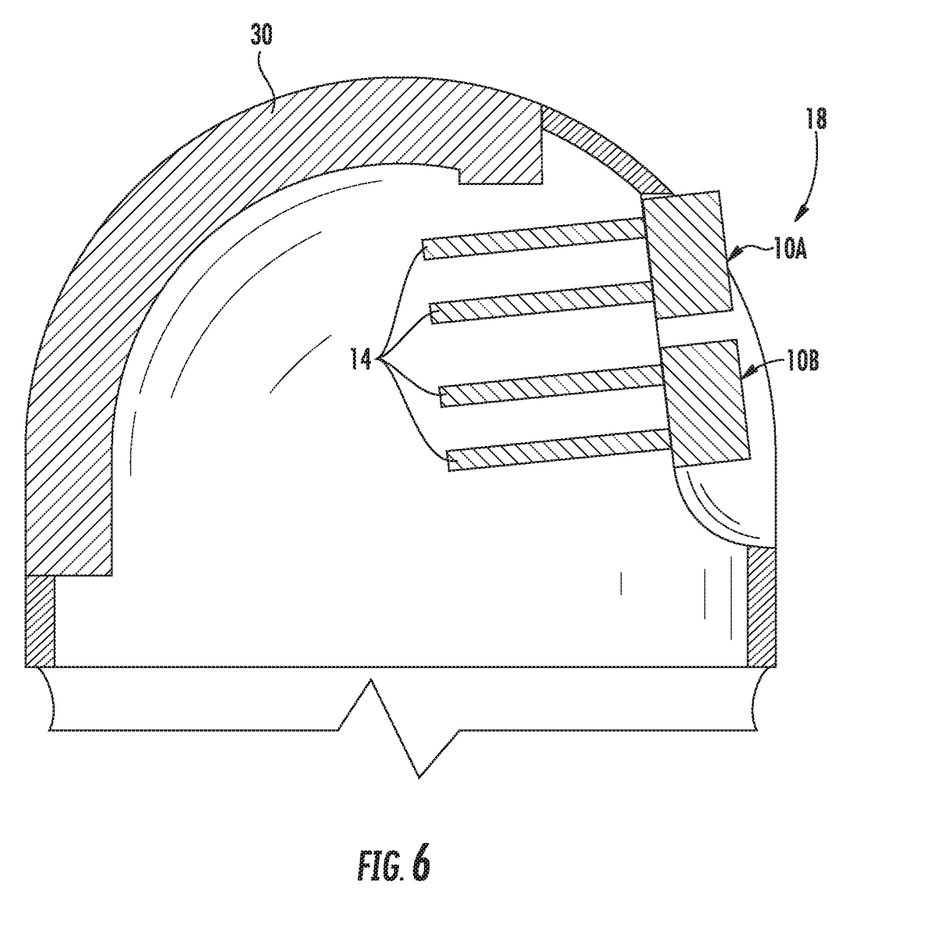
FIG. 6 is a perspective view, shown in cross-section, of the dispensing canister apparatus with thermochromic clips secured thereto.

In a preferred embodiment of the dispensing canister apparatus 18, actuation of the control 30 is prevented when the thermochromic clips 10A and 10B are secured in the first and second receptacles 19A and 19B on the dispensing canister apparatus 18. Referring to FIG. 6, the fastener 14 of thermochromic clip 10A is positioned such that actuation via downward movement of control 30 is obstructed. This serves two primary purposes: (1) prevents accidental actuation and (2) encourages use and understanding of the thermochromic clips 10A and 10B. In other embodiments of the invention, a pin or other object may be used for obstructing movement of the control 30.

Figure 7:
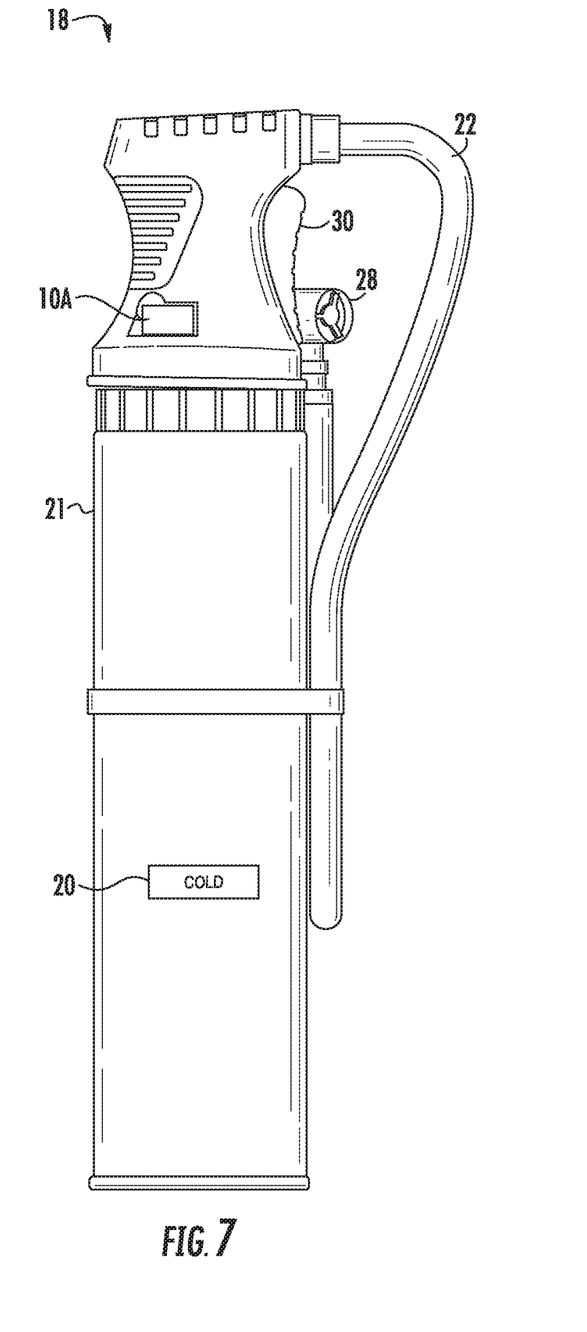
FIG. 7 is a perspective view of another embodiment of the dispensing canister apparatus with thermochromic clips secured thereto.

Referring to FIG. 7, another embodiment of the dispensing canister apparatus 18 is shown wherein the control 30 is a trigger. Again, actuation of the control 30 is prevented when one of the thermochromic clips 10A and 10B (not pictured) are secured in the first and second receptacles 19A and 19B on the dispensing canister apparatus 18. In this particular embodiment, the fastener 14 of thermochromic clip 10A is positioned such that actuation via lateral movement of control 30 is obstructed.

Figure 8:
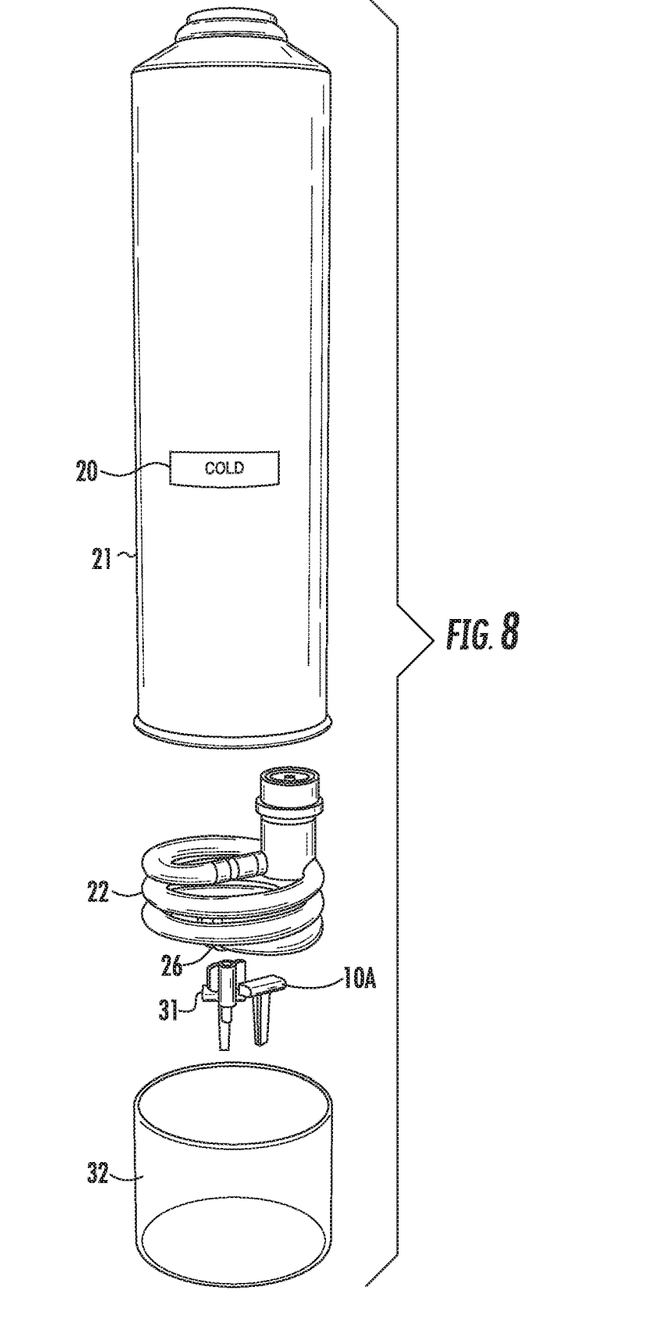
FIG. 8 is an exploded perspective view of another embodiment of the dispensing canister apparatus.
Figure 9:
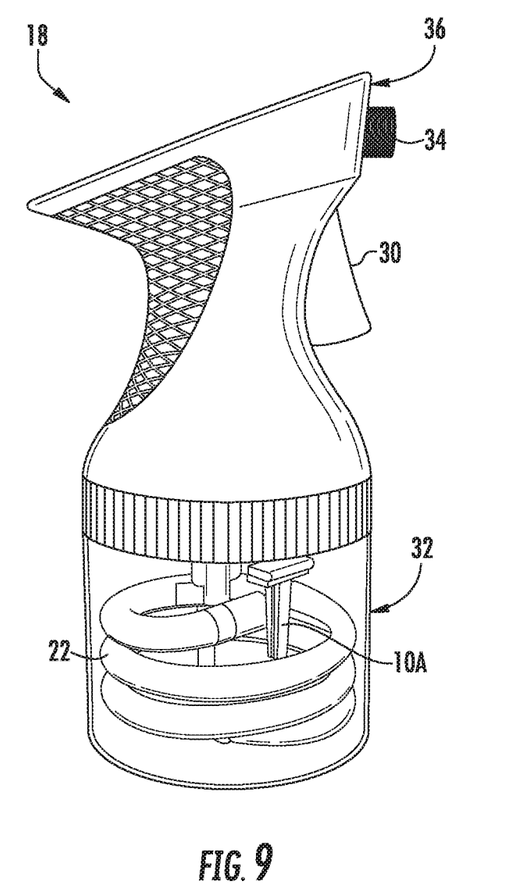
FIG. 9 is a perspective view of the dispensing canister apparatus shown in FIG. 8 with the replaceable canister removed therefrom.

Referring to FIGS. 8 and 9, another embodiment of the dispensing canister apparatus 18 is shown wherein the canister 18 is securable to a bottom cap 32 sized for holding the hose member 22, the trigger attachment piece 31 and the one or more thermochromic clips 10A, thereby making the canister 18 interchangeable for inexpensive replacement. Referring specifically to FIG. 9, a nozzle 34 on the trigger cap member 36 is provided for attachment of the coupling member 26 of the hose member 22. Control 30 on the trigger cap member 36 is provided for operating the release of the refrigerant.

While the present invention has been shown and described in accordance with several preferred and practical embodiments, it is recognized that departures from the instant disclosure are contemplated within the spirit and scope of the present invention which are not limited except as defined in the following claims as interpreted by the Doctrine of Equivalents. For example, this invention is applicable to home and commercial air conditioners as well as automobile air conditioners.

What is claimed is:

1. A dispensing canister apparatus for controlled release of a stored fluid, said dispensing canister apparatus comprising:

First and second thermochromic clips for providing a visual indication of the ambient air temperature of the air flowing through an air vent of an automobile, and each of said first and second theremochromic clips comprising:
an elongate body having an outer facing surface;
a fastening member on said elongate body, and said fastening member being sized and configured for selective attachment to an object; and
at least the outer facing surface of the elongate body being coated with a thermochromic material, and said thermochromic material of said outer facing surface being structured and disposed for changing from a first color state to a second color state in response to a change in temperature that places said thermochromic material at a temperature equal to or below a predetermined temperature value;
a canister having an outer wall defining an inner cavity and including first and second receptacles each being sized for storage of a corresponding one of said first and second thermochromic clips;
a hose member surrounding a channel and having first and second open ends, and said first open end being connected to said canister such that said channel is in fluid flow communication with said inner cavity;
a control on said canister for selectively actuating the flow of the stored fluid from said inner cavity into said channel and through a coupler member at said second open end of said hose member; and
wherein storage of said first thermochromic clip in said first receptacle positions said fastening member such that it obstructs movement of said control for actuating the flow of the stored fluid.

2. The dispensing canister apparatus as recited in claim 1 wherein the outer wall of said canister includes a groove for partial engaged receipt of said hose member.

3. The dispensing canister apparatus as recited in claim 1 wherein the predetermined temperature value of said thermochromic material is selected for visually indicating an optimum fill level of refrigerant in the air conditioning system.

4. The dispensing canister apparatus as recited in claim 3 wherein the predetermined temperature value of said thermochromic material on said first thermochromic clip is higher than the predetermined temperature value of said thermochromic material on said second thermochromic clip.

5. The dispensing canister apparatus as recited in claim 3 wherein the predetermined temperature value of said thermochromic material on said first thermochromic clip is selected from a range between 60° F. and 70° F.

6. The dispensing canister apparatus as recited in claim 3 wherein the predetermined temperature value of said thermochromic material on said second thermochromic clip is selected from a range between 45° F. and 55° F.

7. The dispensing canister apparatus as recited in claim 1 further comprising a surface coating on an outer facing surface of said outer wall of said canister, and said surface coating including said thermochromic material that is structured and disposed for changing from a first color state to a second color state in response to a change in temperature that places said thermochromic material at a temperature equal to or below a predetermined temperature value.

* * * * *